3,049,662
Patented Aug. 14, 1962

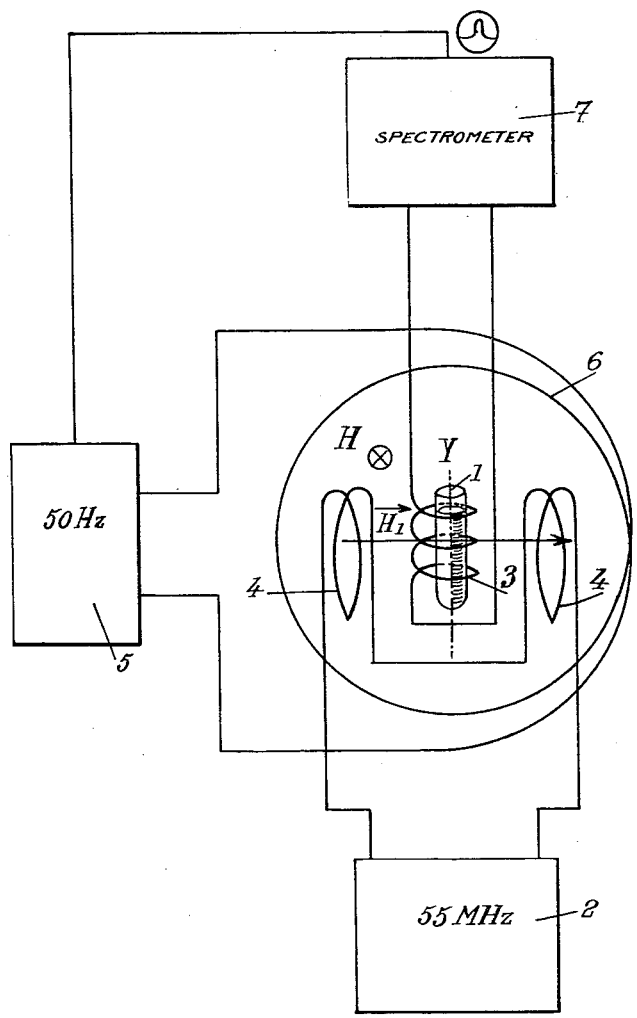

3,049,662
METHOD AND DEVICE FOR THE MEASUREMENT OF MAGNETIC FIELDS BY MAGNETIC RESONANCE
Anatole Abragam, Gif-sur-Yvette, Jean Combrisson, Montgeron, and Ionel Solomon, Chatillon-sous-Bagneux, France, assignors to Commissariat a l'Energie Atomique, Paris, France
Filed May 14, 1959, Ser. No. 813,158
Claims priority, application France Apr. 6, 1957
10 Claims. (Cl. 324—.5)

This invention relates to the measurement of magnetic fields, even of very small strength, e.g. of the earth's field, by magnetic resonance.

It is an object of the invention to provide a method and device for the quick and accurate measurement of magnetic fields, especially of weak or very weak magnetic fields.

It is another object of the invention to provide a method and device for measuring with a great relative precision the earth's magnetic field, especially in view of determining accurately the local variations thereof.

It is also an object of the invention to provide a method and device for the geophysic prospection by determining the local variations of the magnetic field.

A further object of the invention is to provide means, light in weight and of rugged construction, permitting the correct and precise measurement of the earth's magnetic field, especially from aboard a plane, especially for detecting valuable deposits.

It is still another object of the invention to provide a device generating directly an electromagnetic energy, the frequency of which is proportional to the magnetic field to be measured.

It is a further object of the invention to provide a rugged device of the above-mentioned type which includes a counter indicating directly the magnetic field with a very great precision.

It is also an object of the invention to provide a device giving directly the intensity of an even weak magnetic field and which can be used by a non-technical personnel.

In order to give a fair explanation of this invention it seems necessary to acquaint the reader with the most important known facts about the magnetic resonance and for this purpose we give first the following statement.

It is known that the atomic nuclei enjoy a spin or angular momentum $$\vec{R}$$

(corresponding to an internal mass rotation) and a magnetic moment $$\vec{\mu} = \gamma \vec{R}$$

(which shows that they act as if they were small magnets).

Therefore, when a nucleus, having an angular momentum and a magnetic moment different from zero, is placed in a uniform magnetic field $$\vec{H}$$

having a strength H, e.g. the earth's magnetic field, it wobbles or precesses with a frequency F, often called the Larmor frequency, given by the formula:

(1) $$F = \gamma \frac{H}{2\pi}$$

($\gamma$ being generally known as the gyromagnetic ratio).

Such a precession (which is similar to the precession of a gyroscope which is spinning rapidly around its axis in the gravity field) is due to the action on the angular momentum or nuclear spin (resulting from a rotation of the nucleus around its own axis, which corresponds to the gyroscope rotation), of the torque resulting from the interaction between the nuclear magnetic moment and the external magnetic field (said torque corresponding to the gravity torque resulting from the interaction between the gyroscope weight and the gravity field).

Further, if an alternating magnetic field $$\vec{H_1}$$

of frequency $f_1$, the magnitude $H_1$ of said field being small in comparison with H, is applied along an axis perpendicular to magnetic field $$\vec{H}$$

an absorption of energy by the nuclei takes place, said absorption resulting from the change of a portion of the nuclei from the parallel to the anti-parallel position (relatively to field $\vec{H}$)

Such absorption is a function of $f_1$, H and $H_1$ and reaches its maximum value when frequency $f_1$ is equal to the Larmor frequency corresponding to field $$\vec{H}$$

i.e. when (1) $$f_1 = \frac{\gamma H}{2\pi}$$

The nuclei change then from one energetic state to another energetic state separated by an energy difference $\Delta E = h f_1$ (h being Planck's quantum constant).

Of course it would also be possible in some cases (as will be explained hereinafter) to produce an emission of energy of same magnitude if it were possible to change the $$\vec{\mu}$$

vectors from the anti-parallel to the parallel position.

Thus we see that, when the absorption detected e.g. in coils producing field $H_1$ is a maximum, the relation $$f_1 = \gamma \frac{H}{2\pi}$$

is verified (nuclear magnetic resonance condition), which allows to determine H from $f_1$ and $\gamma$; as $\gamma$ is known for some nuclei with a precision within about $\frac{1}{100,000}$ ($\gamma = 26,752 \pm 2$ sec.$^{-1}$ gauss$^{-1}$ for the proton or nucleus of hydrogen atom) and as the frequency $f_1$ can generally be measured with an equivalent precision, it seems theoretically possible to determine H with an absolute precision of about $\frac{1}{50,000}$ and with a still better precision stability.

It has been proposed, e.g. in U.S. Patent No. 2,561,489, issued on July 24, 1951, to Bloch and Hansen, to use the nuclear magnetic resonance in order either to measure a magnetic field, by placing nuclei of known gyromagnetic ratio (e.g. protons) in said field, or to perform a chemical non-destructive analysis, by placing in a magnetic field of known magnitude H a sample and determining the gyromagnetic ratios of the nuclei of said sample (the gyromagnetic ratios having different values for the various nuclei of non-zero angular momentum and magnetic moment).

In these known processes and in particular in the process disclosed in the above-mentioned U.S. Patent No.

2,561,489, said nuclei of known or unknown gyromagnetic ratio γ are placed in a uniform magnetic field $$\vec{H}$$

having a known or unknown magnitude H respectively, sinusoidally modulated at low frequency with an amplitude which is a small fraction of H and in an alternating magnetic field $$\vec{H_1}$$

perpendicular to $$\vec{H}$$

obtained by means of turns which have their axis perpendicular to $$\vec{H}$$

and which carry a current of radio-frequency $f_1$, the resonance being obtained when $$f_1 = \gamma \frac{H+h'}{2\pi}$$

wherein $h'$ is the modulation of field H at the resonance.

The measure of H is therefore reduced to the determination of the resonance frequency which can be measured by known means with an accuracy above $\frac{1}{1,000,000}$.

But it must be considered that when observing the nuclear resonance of nuclei having a non-zero spin, the thickness or breadth ΔH of the resonance lines or bands—which increases when the uniformity of field $$\vec{H}$$

(in the zone occupied by the sample containing said nuclei) and the mobility of said nuclei (which is much greater in the liquid state than in the solid state) diminish—and the ratio signal to noise, e.g. in a pick-up coil A having the axis thereof perpendicular both to $$\vec{H} \text{ and } \vec{H_1}$$

and detecting the resonance, limit the precision ∂H of the measure, for example of field H; in fact, it may be stated that:

(2) $$\partial H = \frac{\Delta H}{\text{signal/noise}}$$

which shows that, in order to obtain a great precision, uniform magnetic fields, samples containing nuclei in a liquid (or eventually gaseous) state and strong signals should be used.

But the resonance signal rapidly decreases with the magnetic field, thereby limiting the application of the nuclear magnetic resonance by the above-mentioned processes to fields which are sensibly equal to or superior to 10 gausses (oersteds).

More precisely, the signal is proportional to:

(3) $$S = Q v n \gamma^3 H^2$$

where:

$Q$ = quality factor of coil A
$v$ = volume of the sample,
$n$ = number of turns by centimeter of coil A.

In fact, calculation shows that, when taking into consideration the minimum possible value of the capacity of the tuned circuit used for detecting the resonance, the optimum signal that can be detected is given by the formula:

(4) $$S_{opt} = Q\sqrt{v}\gamma^2 H$$

In order to obtain a signal as strong as possible, it is therefore interesting to use a non-zero spin having the highest available gyromagnetic ratio. Among the nuclear spins, it is the proton (nucleus of the hydrogen atom) which enjoys the highest gyromagnetic ratio.

It is however known that the electrons enjoy a magnetic moment which is roughly 666 times higher than the magnetic moment of the proton although they have the same spin (1/2). Therefore the electronic spins have a frequency of resonance which is of 28 mHz. in a field of 10 gausses, whereas in the same field, the proton spins have a frequency equal to 42.6 kHz. according to the Formula 1, as for the electron γ=26,752×666.

Therefore, it seemed appealing to determine the resonance frequency of electronic spins, but unfortunately, the electronic resonance band is, in the most favorable instances, much larger than a nuclear resonance line and does not allow a precise determination of the fields according to Formula 2.

It is why it was necessary, in order to measure precisely magnetic fields, to use, e.g. according to the above-mentioned U.S. Patent No. 2,561,489, a nuclear resonance line, as the resonance line of hydrogen nuclei in water, said line being narrow and one of the strongest lines of nuclear resonance. Said line is however very weak for small magnetic fields. For example, a specimen of 10 cm.³ of ordinary water does not give in a field of 10 gausses (frequency: 42.6 kHz.) any detectable signal.

In order to obviate such weakness of the resonance signal, two methods have been used until now; these methods are:

(a) The use of a very large sample with a demodulator having a very narrow band (lock-in type demodulator); such a process gave a signal which was 8 times stronger than the noise for a sample of 2 liters of water placed in the earth's magnetic field;

(b) The previous polarization of the nuclear spins of the sample to be analyzed in a relatively strong field (e.g. a field of 100 gausses); the polarizing field is suddenly cancelled and the free precession of the spins in the earth's magnetic field is observed: the resonance signal thus obtained with a sample of 1 liter of water in the earth's magnetic field is sufficient, but the energy used, especially in order to obtain the polarizing field, as well as the difficulty of cutting off suddenly said polarizing field render this method very difficult to use and demand a very important apparatus.

On the other hand, Overhauser has determined theoretically (Physical Review 91, p. 476, 1953, and 92, p. 411, 1953), that the saturation of the conduction electron spin resonance in a metal should produce an increase of the nuclear polarization, by a factor which could be over 1000, by magnetic interaction with the conduction electrons.

Experiments performed by Carver and Slichter (Physical Review 102, p. 975, 1956), have demonstrated the at least partial pertinency of Overhauser's predictions by observing, in fields over 10 gausses, the nuclear resonances of lithium 7, sodium 23 and the proton when saturating the conduction electron resonance of a metal or a metallic solution in liquid anhydrous ammonia.

It was also shown theoretically ("Overhauser Effect in Non-Metals," by A. Abragam, Physical Review 98, p. 1729, 1955, and "Relaxation Processes in a System of Two Spins," by I. Solomon, Physical Review 99, p. 559, 1955), that such increase of the nuclear polarization could also take place in paramagnetic solutions.

For example, a specimen of a few cubic centimeters of water (or of any other liquid, as benzene, producing a narrow nuclear resonance line), in which paramagnetic impurities were previously dissolved ("doped" water), was used so that the major proton relaxation mechanism was the interaction between the electronic spins and the dissolved paramagnetic impurities.

Under these conditions, if the electronic resonance line is saturated by applying, at right angle with the field to be measured, a strong radio-frequency field at the electronic resonance frequency $F_E$, the polarization of the nuclear spins (protons in the case of water) increases in the ratio:

(5) $$\rho = \alpha \frac{F_E}{F_N}$$

wherein: $F_N$ is the nuclear resonance frequency in the magnetic field to be measured, $F_E$ is the electronic resonance frequency in said field and $\alpha$ is a coefficient, depending on the detailed relaxation mechanism and on the saturation degree of the electronic resonance, inferior to or, at most, equal to 1.

If the electronic line is simple (no hyperfine structure), the ratio $\rho$ is independent of the field to be measured and has a value (6) $$\rho_0 = 666\alpha$$

for the protons.

It is therefore possible to obtain a rather important increase of the signal for a typical value of $\alpha$ ($\alpha = 0.5$ for a dipole-dipole interaction and a complete saturation).

In the Overhauser effect limited to metals or extended to paramagnetic substances, an energy exchange takes place between the electronic and nuclear spins and the "atomic lattice" (said "atomic lattice" being the remainder of the atomic system wherein the nuclei are placed), the maximum nuclear polarization which can be obtained by saturating the electronic resonance depending upon the type of interaction between electronic and nuclear spins and upon the mechanism whereby the lattice provides the energy for the relaxation. This increase of polarization produces a proportional increase of the amplitude of the nuclear magnetic resonance (the increase over the proton being not superior to 666) which is observed for the resonance frequency $F_N$, whereas the resonance amplitude is the amplitude caused by a polarization which corresponds to the frequency $F_E$.

Under these conditions, it is possible to saturate the electronic resonance band, which is rather broad, at a frequency $F_E$, which may be for example in the microwave band for a field H of about 10 to 10,000 gausses and the resonance is observed at a much inferior frequency, e.g. a radio-frequency coresrponding to the narrow nuclear resonance line $F_N$. Such an experimental process of verification of Overhauser's effect is described in the above-mentioned article of Carver and Slichter.

Of course, $$F_N = \gamma_N \frac{H}{2\pi}$$

and $$F_E = \gamma_E \frac{H}{2\pi}$$

wherein $\gamma_N$ and $\gamma_E$ are the gyromagnetic ratios of the nucleus and of the electron respectively. If $\gamma_P$ is the gyromagnetic ratio of the proton, $\gamma_E = 666\gamma_P$, this relation limiting the polarization increase which may be obtained by such a process.

In FIGURE 1, the resonance frequencies (in mHz) were plotted against the fields H (in gauss) and two straight lines P and E, having respectively the slopes $$\frac{\gamma_P}{2\pi}$$

and $$\frac{\gamma_E}{2\pi}$$

represent Formula 1 for the proton and the electron respectively: the straight line P is practically identical with the abscissae axis.

These straight lines represent also, with another scale for the ordinates, the variation of the energy $\Delta E$ emitted or absorbed by the turning over of the protonic and electronic spins, at the resonance (because $\Delta E$ is proportional to the resonance frequency) and consequently, with still another scale for the ordinates, the amplitude of said resonance.

It is seen on said FIGURE 1 that, although multiplied by factor 666 when passing from the proton to the electron (or by a factor which may be superior to 1000 when passing from a nucleus having a smaller $\gamma$ than the proton to the electron), the resonance amplitude is small for weak fields as the earth's magnetic field (about 0.5 gauss). For H=1 gauss, the maximum resonance frequency $$F_E = \frac{\gamma_E}{2\pi}$$

and $$\Delta E = hF_E = \frac{h}{2\pi}\gamma_E = 1.85 \times 10^{-20} \text{ ergs}$$

for each electron; the resonance signal is practically undetectable except with a very large specimen.

We have surprisingly discovered that it was possible to still increase the nuclear polarization and accordingly the resonance signal, particularly for weak fields, by dissolving in the sample a paramagnetic substance of a particular type containing at least one electronic resonance line or band presenting a hyperfine structure resulting from an interaction between an electron and a nucleus belonging both to said substance; in such cases there exists an interaction between a nucleus and an electron sensibly stationary relatively to said nucleus, i.e. a true hyperfine structure, which may be called a bound or stationary hyperfine structure in opposition with the structure, sometimes also called hyperfine structure, considered in the Overhauser's effect, wherein a conduction electron or an electron from a paramagnetic substance (generalized Overhauser's effect) interacts with a nucleus relatively to which it is free to occupy several positions, only the mean position having an influence.

The substances which are capable to supply such an increase of the polarization by hyperfine structure interaction are generally free radicals or ions (the nucleus thereof being advantageously a nitrogen nucleus) and they contain at least one electron having magnetic moments combined so as to form a non-zero electronic magnetic moment, said electron being bound to the molecule and the life time of said substances in active state being sufficient for allowing the saturation of their electronic band or bands of stationary hyperfine structure.

The dissolved paramagnetic impurity may be advantageously constituted for example of ions of nitrosodisulfonate [$(SO_3)_2NO$]−− (also called peroxylamine disulfonate) or diphenyl-picryl-hydrazil; the quantity of said impurity to be dissolved in the sample is not at all critical.

We have also discovered that, when such substances are dissolved e.g. in water (compound which contains protons), the curves obtained, when plotting the variations of the electronic resonance frequency against the uniform magnetic field H, instead of being straight lines starting from the zero point as for electronic resonances of the Overhauser's type (curve E) or for the nuclear resonances (curve P), are curves $S_1$ to $S_8$ some of which start from a point $F'_E$ having for a zero abscissa an ordinate which is different from zero, the electronic resonance frequency $F_s$ (which is $F'_E$ in the absence of magnetic field) of the paramagnetic impurity of the above-mentioned special type being different from that given by the Formula 1

(1) $$F = \gamma \frac{H}{2\pi}$$

whereas, of course, the nuclear resonace frequency F which permits the measure of the field H is given by said formula. The curves $S_1$ to $S_8$ corresponding to the nitrosodisulfonate are represented in FIGURE 1; a portion of these curves, i.e. curves $S_1$, $S_2$, $S_3$, $S_4$ and $S_5$ start from the point $F'_E$ having an ordinate of about 55 mHz., whereas the other curves $S_6$, $S_7$ and $S_8$ start from the zero point.

It should be considered that curves $S_1$ to $S_8$ are substituted to straight lines E and P which disappear due to the stationary or true hyperfine structure, whereas straight line E (or a straight line E' having a similar slope in order to take account of coefficient α in Formula 5 exists in case of a free Overhauser interaction due to the electron mobility in this last case.

It should also be considered that curves $S_6$ to $S_8$ are less interesting than straight line E when measuring weak or very weak magnetic fields, whereas curves $S_1$ to $S_5$ are much more advantageous for such fields; the ratio between the electronic resonance frequency $F_s$ of a paramagnetic substance having a stationary hyperfine structure and the theoretical maximum resonance frequency of a substance (as a metal) with "free" electrons in a field of 0.5 gauss (the earth's field) being about 40, as calculated hereinunder.

The process according to the invention consists therefore in dissolving in a sample containing nuclei or spins, e.g. protons, a paramagnetic substance of the free radical or ionic type presenting at least one saturable electronic magnetic resonance line or band presenting a stationary hyperfine structure—i.e. including in its structure at least one electron of total electronic magnetic moment different from zero in stationary interaction with at least one nucleus—the electronic resonance frequency of said line having an important value, e.g. superior to 1 mHz. in the absence of magnetic field, in disposing said sample in the magnetic field to be measured, in saturating said band at said frequency and in determining the nuclear resonance frequency of said first-mentioned nuclei or spins.

Among the paramagnetic substances which may be used, the preferred substances are listed hereinunder, without said list being in any way limitative of the invention:

Potassium or sodium nitrosodisulfonate, dissolved in water, pyridine or formamide;
Diphenyl-picrylhydrazyl, dissolved in benzene or other organic products;
Tetraphenylstibonium nitrosodisulfonate, dissolved in ether;
Picryl-aminocarbazyl dissolved in benzene;
Semiquinone ions, e.g. $(O=C_6H_4-O)^-$ ions, dissolved in water.

The use of a dissolved impurity presenting an electronic resonance line with a hyperfine structure allows, according to the invention, to perform the saturation of a resonance line of the electronic spins at a resonance frequency much higher (e.g. 50 times higher) than in the absence of such hyperfine structure; on the other hand, the measure of the magnetic field is made by determining the nuclear resonance, which allows a great precision due to the fact that the line of nuclear resonance is very sharp.

It should also be noted that until now, e.g. as disclosed in U.S. Patent No. 2,461,589, it was necessary to provide either a frequency sweep or a field sweep in order to obtain the resonance i.e. in order to determine the center of the resonance band or line. Such a procedure included many drawbacks, especially:

The demand for a generator of very stable frequency;
The production of a sweep;
The possible perturbation, by the sweep, of the field to be measured;
The introduction of an error due to the difficulty to estimate very precisely the center of the resonance line or band But we have observed that even in the conventional Overhauser effect i.e. when applied to metals, and also in the Overhauser effect extended to ordinary paramagnetic substances, i.e. to paramagnetic substances without true hyperfine structure, the signal was not only increased by a factor which is often large, but that this increase of the signal could, under certain conditions on the sign of the nuclear moment, take place with the emission of energy by the nuclear spins instead of energy absorption as it happens when one realizes the resonance by absorption by nuclear spins. Such energy emission is still more important in the case of paramagnetic substances with true or bound hyperfine structure of the above-mentioned type.

The device according to the invention is precisely based on such spontaneous energy emission by a system of nuclear spins submitted to the Overhauser effect or preferably to the effect resulting from the introduction of paramagnetic substances having a stationary hyperfine structure.

In fact, a sample of such nuclear spins disposed in a magnetic field emits a signal having a frequency which is perfectly proportional to the magnitude of said magnetic field, the measure of said field being accordingly reduced to the precise measure of said frequency. We have in fact made the surprising discovery that when a sample containing nuclear spins relaxed by electronic spins is surrounded by a coil of a pick-up circuit capable of detecting the nuclear resonance and having a Q factor superior to a certain value which depends on the geometrical characteristics of the coil, said pick-up circuit spontaneously emits electromagnetic energy at the nuclear resonance frequency $F_N$ which is given by the formula $$F_N = \gamma_N \frac{H}{2\pi}$$

According to the invention, the explorator sample placed in the field to be measured is constituted by a certain quantity of a liquid containing the nuclei (for example protons), the nuclear resonance of which is to be observed, added with a small quantity of dissolved paramagnetic impurities, preferably of the above-mentioned special type.

A device according to the invention comprises therefore means for maintaining in the magnetic field to be measured a container for a sample containing, on the one hand, nuclei having non-zero angular momentum and magnetic moment, on the other hand, a paramagnetic substance and emitting, when one of its electronic resonance bands is saturated, energy at the frequency of the nuclear resonance line of said nuclei, means for saturating one of the electronic resonance bands of said paramagnetic substance, means for picking-up the emitted energy and means for measuring the frequency of the picked-up energy.

When the magnetic field to be measured is weak or very weak (for example when measuring the earth's magnetic field), it is essential, in order to increase the sensibility of such frequency self-generator, to constitute the impurities by a paramagnetic substance possessing an electric resonance line having a hyperfine structure of the above-mentioned special type, i.e. a substance as a nitrosodisulfonate, diphenyl-picryl-hydrazil, etc.

Of course, the quantity of the dissolved impurity is not at all critical.

In the particular case when the pick-up coil receiving the spontaneous or sustained oscillations at frequency $F_N$ should possess a very high Q (e.g. above 300), it is possible to provide means for increasing artificially said Q, for example by positive reaction or feed-back or by dividing the coil in the low-frequency detection circuit in two portions, one portion receiving the proton signal and the other, disposed at a distance of the first portion, enjoying a very high Q, e.g. due to a ferrite core.

The invention will be now described in fuller detail with reference to the appended drawings representing some preferred embodiments of the invention given only for illustration purposes.

Referring to the drawings, FIGS. 1 and 2 represent, in full lines, respectively the electronic resonance frequencies $F_s$ in mHz. and the energy levels E (the difference of the energies for a zero magnetic field being taken as a unit)

for the nitrosodisulfonate spins plotted against the magnitudes of the magnetic field (in gauss) wherein said spins are placed.

FIG. 3 shows diagrammatically a known device with a field sweep allowing the embodiment of the process according to the invention.

Figure 2:
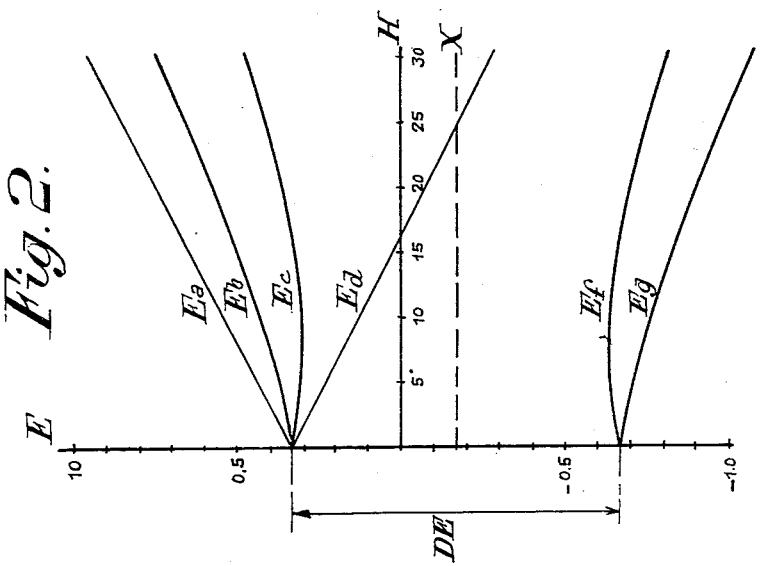

Contrarily to the nuclear resonance lines (represented e.g. by straight lines P corresponding to protons) and to the electronic resonance bands of metals and paramagnetic substances with mobile resonance electron or electrons (represented by straight lines E—$\alpha=1$ i.e. best value of $\gamma_E$, and E'—$\alpha=\frac{1}{2}$ for a dipole-dipole interaction with complete saturation), the bands of paramagnetic substances having a stationary hyperfine structure correspond to curves $S_1$ to $S_8$, obtained from curves $Ea$ to $Eg$ of FIG. 2 which represent the diagram of the energy levels plotted against magnetic fields in the case of such hyperfine structure, for example in the case of nitrosodisulfonate.

It is known that a nucleus having a spin I enjoys, in a magnetic field $2I+1$ values for its measurable components. In case of a hyperfine structure of paramagnetic ion, due to the coupling of an electronic spin I', with a nuclear spin I, there are therefore $(2I'+1)$ $(2I+1)$ energy levels. As $I'=\frac{1}{2}$ for the electron and $I=1$ for the nitrosodisulfonate ion, such ion enjoys $2 \times 3 = 6$ energy levels (curves $Ea$ to $Eg$).

It is possible to derive from curves $Ea$ to $Eg$, which may be determined by calculation, curves $S_1$ to $S_8$ by utilizing the afore-mentioned formula $\Delta E = hf_1$ which shows that the curves $S_1$ to $S_8$ may be obtained by determining the differences between the ordinates of curves $Ea$ to $Eg$ taken 2 by 2 and by choosing adapted ordinates. If one considers FIG. 2, it is easy to see that curves $Eb$ and $Ec$ correspond to curves $Ef$ and $Eg$ respectively by a symmetry relatively to the axis X; therefore the curves $S_6$ to $S_8$ derive from the differences between curves $Ea$ to $Ed$, taking of course into consideration only the allowed transitions, whereas curves $S_1$ to $S_5$ result from the differences between a curve from group $Ea$ to $Ed$ and a curve from group $Ef$, $Eg$, account being taken of the above-mentioned symmetry, on the one hand, and of only the allowed transitions, on the other hand.

It is therefore the difference DE (taken as ordinate unit on FIG. 2) of the energies in a zero magnetic field between the curves of group $Ea$ to $Ed$ and the curves of group $Ef$, $Eg$ (resulting from the stationary hyperfine structure of the added paramagnetic substances) which motivates and causes the existence of a non-zero resonance frequency $F'_E$ in a zero magnetic field; this fact allows a considerable increase, particularly in very weak magnetic fields, as the earth's field, of the signal amplitude and consequently of the measurement precision.

In fact, for a very weak field, the electronic resonance frequency $F_s$ of a line of the type $S_1$ to $S_5$ (and in particular of line $S_1$) is much greater than (7) $$F_E = \gamma_E \frac{H}{2\pi}$$

($\gamma_E$ being the value of the electron gyromagnetic ratio).

If one of the lines having a frequency in the vicinity of $F_s$ is saturated, the increase of the nuclear resonance signal becomes:

(8) $$\rho' = \alpha \frac{F_s}{F_N}$$

instead of the preceding value:

(Formula 5)

$$\rho = \alpha \frac{F_E}{F_N}$$

therefore $\rho' \gg \rho$ because $F_s \gg F_E$.

For example, for nitrosodisulfonate disposed in the earth's magnetic field (0.5 gauss), $F_E = 1.4$ mHz., $F_s = 55$ mHz., and the nuclear resonance signal is increased in the ratio:

$$\frac{F_s}{F_E} = \frac{55}{1.4} = 39.2$$

Referring now to the diagrammatic FIG. 3, we will describe a non-limitative example of embodiment of our method for measuring weak or very weak magnetic fields with a paramagnetic substance having a stationary hyperfine structure.

In such embodiment the device is similar to that described in the above-mentioned U.S. Patent No. 2,451,589; the field to be measured is the earth's field H, which is perpendicular to the plane of the drawing and the sample 1 used for the measure is a milli-molecular solution of potassium nitrosodisulfonate in 20 cm.³ of pure water containing a potassium carbonate concentration of M/20 (M corresponding to the normal molecular concentration of 1 mole per liter). Oscillator 2, giving an output of 10 watts, oscillates at a frequency $F_s$ of 55 mHz., adjustable at ±2 mHz., which is the resonance frequency in a zero magnetic field of the nitrosodisulfonate ion (whereas when using the process of aforementioned U.S. Patent No. 2,451,589), a nuclear resonance frequency of 55 mHz., is observed only for very strong magnetic fields, due to the coefficient $\rho'$ in Formula 8.

Oscillator 2 allows to saturate one of the electronic resonance bands, for example line $S_1$, of the disulfonate ion by creating through coils 4, a magnetic field $$\vec{H_1}$$

perpendicular to field $$\vec{H}$$

A low frequency oscillator 5 (e.g. a 50 Hz. oscillator) modulates or sweeps said field $$\vec{H}$$

by means of coil 6 with an alternating amplitude of e.g. 2 milligausses and allows to find out the resonance which is detected by means of a coil 3 having the axis Y thereof perpendicular to $$\vec{H}$$

the axis Y being also, although not necessarily, as in the case of U.S. Patent 2,451,589, perpendicular to $$\vec{H_1}$$

The resonance takes place when $$F_N = \gamma_P \frac{H + h'}{2\pi}$$

wherein $F_N$ is the nuclear resonance frequency in coil 3, $\gamma_P$ the proton gyromagnetic ratio and $h'$ the modulation of field $$\vec{H}$$

at the resonance.

The nuclear resonance signal is observed by means of a spectrometer 7, e.g. of the type realized by Pound, Knight and Watkins (Rev. of Sci. Instr. 21, 1950), modified for its use at very low frequencies (2,100 Hz., resonance frequency of the proton in the earth's field H to measure); the modification consists essentially in the substitution of a high impedance (1–2$M\Omega$) entrance circuit (necessary for this very low frequency) to the conventional low impedance (of a few $K\Omega$) necessary for the higher frequencies (above 1 mHz.).

The frequency is measured with a great precision by counting during e.g. 100 seconds and gives the value of field H from the above-mentioned formula.

It is of course possible to use other means for determining the resonance frequency, for example a cathode ray oscilloscope having its horizontal deviation governed by $H+h'$ and its vertical deviation governed by the resonance signal as described in the above-mentioned U.S. Patent No. 2,451,589.

Figure 4:
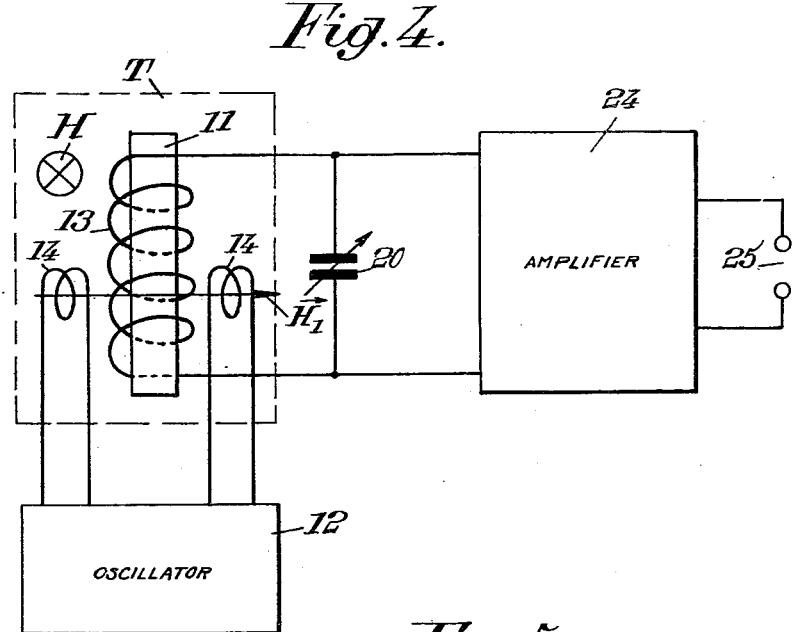
FIGS. 4 and 5 represent, the first one schematically and the second one with more details, two devices according to the invention enabling the accurate measurement of magnetic fields without any frequency or field sweep.
Figure 5:
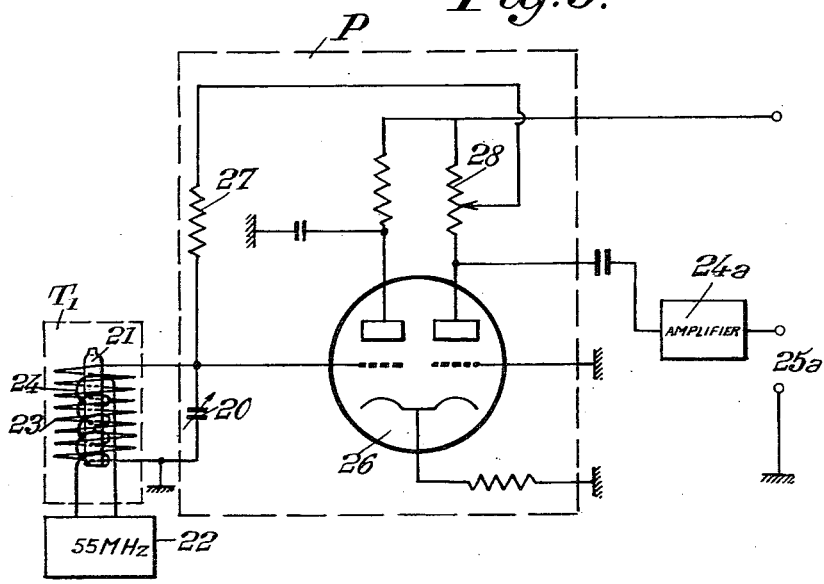

Suitable embodiments of a device, according to the invention, which are particularly convenient for measuring weak or very weak magnetic fields, e.g. the earth's magnetic field for prospection purposes, are represented on FIGS. 4 and 5.

In the embodiment shown schematically on FIG. 4 a sample 11, comprising 20 cm.$^3$ of water with dissolved paramagnetic impurities (preferably of the stationary hyperfine structure type when a weak magnetic field is to be measured) is placed in a high frequency field

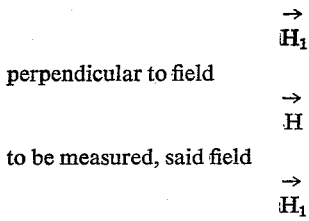

perpendicular to field $$\vec{H}$$

to be measured, said field $$\vec{H_1}$$

being produced by the coils 14 receiving the output of oscillator 12 in order to saturate one of the electronic resonance bands of the paramagnetic impurities.

Due to the breadth of the electronic bands, said oscillator 12 has not to satisfy very critical stability conditions (±1%) or in amplitude (±50%). As said oscillator may be of any known type, it is not described but represented only in block form in FIG. 4.

Figure 1:
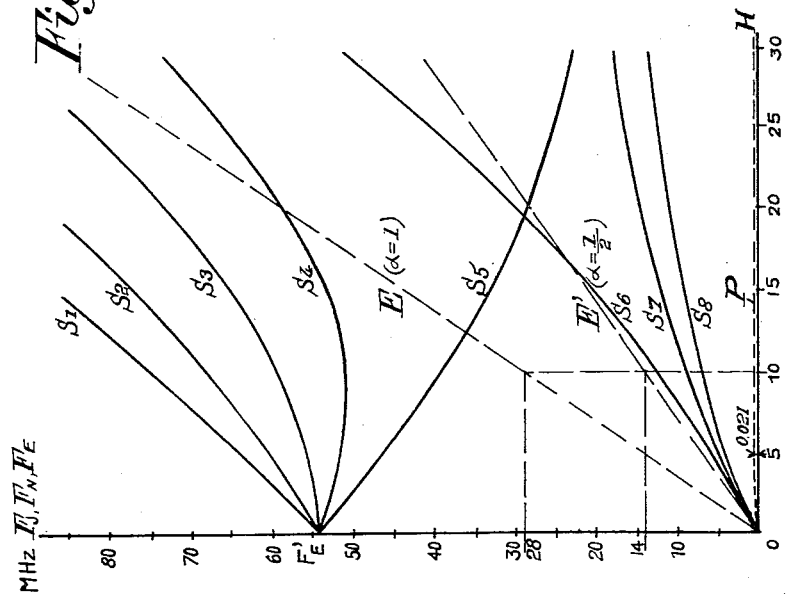

It is further to be considered that when a paramagnetic substance having a hyperfine structure, of the type represented in full lines on FIG. 1, is used the frequency of said generator is practically independent of the frequency of field H to be measured for week fields (for example inferior to 2 gauss).

Sample 11 is placed in a coil 13 of a resonant circuit tuned approximately (by means of a variable condenser 20) on the nuclear reasonance frequency of the proton in the field H and having a sufficiently high Q. The alternating frequency obtained in said reasonant circuit is amplified by an amplifier 24 (of conventional construction represented in block form in FIG. 4), said amplifier 24 delivering in 25 an alternating voltage having a frequency F exactly proportional to the magnitude H of the magnetic field wherein the sample 11 is disposed.

The frequency F is measured in 25 by any known means, for example by direct counting of the periods during a given time; ratio $\gamma$ being known, the field H is calculated from Formula 1.

As it is not always easy to obtain the high Q necessary for sustaining the oscillations, Q having to be superior to a value $Q_0$ which depends upon the sample and the head T used ($Q_0$ being easily determined experimentally in each case by observing the advent of sustained oscillations of frequency F) and which may in some cases be equal or superior to 300, it is possible to increase artifically Q e.g. by a positive feed-back as represented on FIG. 5, which gives a practical example of the head T, the tuned circuit and the feed-back amplifier, which must be utilized for measuring the earth's magnetic field.

The head T includes two concentrical coils, i.e.:

A high frequency coil 24 (energized by oscillator 22 similar to oscillator 12, delivering for example a frequency of 55 mHz.±2 mHz.) which saturates the electronic resonance band of the paramagnetic substance (nitrosodisulfonate) of the sample placed in a container or jar 21, and A low frequency coil 23 tuned on 2100 Hz., resonance frequency of the sample protons, by variable condenser 20 which is an integral part of the preamplifier P including essentially a positive feed-back circuit.

This circuit comprises a tube 26 (of the type 12AT7) connected as a conventional amplifier with an earthed grid, and the feed-back or reaction is obtained by resistor 27 having a value of 5 $M\Omega$. The feed-back ratio is easily adjusted by a potentiometer 28, having a resistance of 100 $K\Omega$ in this particular example. The resulting voltage, amplified, in amplifier 24a, is available in 25a.

The measurement of the frequencies may be realized in 25a, for example by means of a system of decades which allows a measurement, with a precision within about 1 micro-second, of e.g. 100, 1,000 or 10,000 periods of the Larmor frequency of the protons in the earth's field or another weak field, thereby permitting a relative precision within $2.10^{-5}$, $2.10^{-6}$ or $2.10^{-7}$ respectively.

It is therefore possible to provide according to the invention a device allowing the measurement of even very weak magnetic fields and in particular of the earth's magnetic field device which is very light in weight and very easy to operate by a non-technical personnel because it comprises only a conventional oscillator 22 without important stability requirements, a small and light head T, a preamplifier P (including essentially only a single tube 26 and a potentiometer 28), a conventional amplifier 24a and a counter disposed in 25a.

Such an easily transportable and rugged device, allowing relative measures with a precision of about $10^{-6}$ of weak magnetic fields, and in particular of the earth's field, is particularly well adapted for the geophysic prospection based on the detection of the anomalies of the magnetic field.

Figure 6:
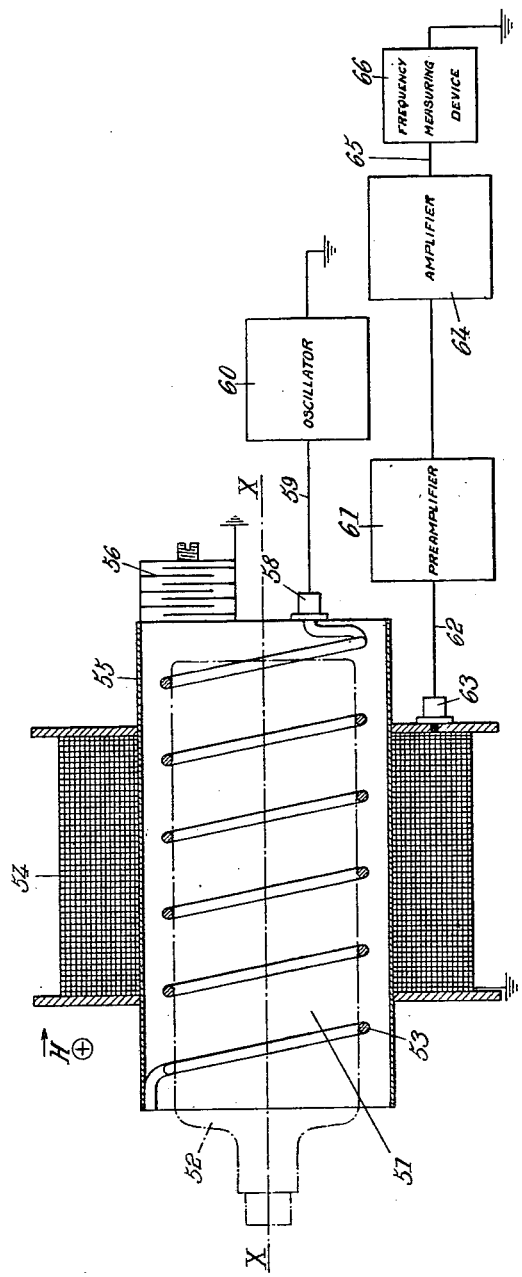
FIG. 6 represents another embodiment of a device according to the invention.

Reference being now made to FIG. 6, it is seen that, according to the invention, the sample 51 containing the nuclei (e.g. protons) and the paramagnetic substance is placed in a vessel or container 52, for example in an organic glass as polymethacrylate (sold under the trademarks "Plexiglas" or "Lucite"), surrounded by a high-frequency coil 53 constituted by a few turns of a 2–3 mm. wire and a low-frequency coil 54 constituted by about 3,500 turns of a 0.4 mm. wire coaxial to said high-frequency coil and shielded one from the other by a shield 55 in a conducting metal (as silver or copper) adapted to constitute the return conductor for the high voltage, but without any ferromagnetic material; coil 53 is a constitutive portion of a high-frequency circuit sharply tuned on the electronic resonance frequency of said sample in the magnetic field to be measured (55 mHz. for a solution in water of nitrosodisulfonate ions in the earth's magnetic field) by an adjustable capacitor 56, so as to saturate one of the electronic resonance lines of said paramagnetic substance, and coil 54 is a constitutive part of a low-frequency circuit sharply tuned by an adjustable capacitor 57 (shown on FIG. 8) on the nuclear resonance frequency (2,100 Hz.) of the protons in said sample, in order to collect the signals of said protons. The input 58 of the high-frequency circuit is fed by a cable 59 from an oscillator 60 of same high frequency, whereas the low-frequency circuit has a Q factor sufficiently high for constituting a self-oscillator and delivers, preferably through a preamplifier 61 (including the adjustable capacitor 57 and connected by a cable 62 to the output 63 of the low-frequency coil 54) and an amplifier 64, in a cable 65 feeding a frequency measuring unit or device 66, which may be advantageously constituted by a decade counter, well known in the art, which enables to measure, with a precision of about one microsecond, 100, 1000 or 10000 periods of the Larmor frequency of the protons in the field to be measured (for example the earth's field), thereby providing a relative precision of $2.10^{-5}$, $2.10^{-6}$ or $2.10^{-7}$ respectively.

Figure 7:
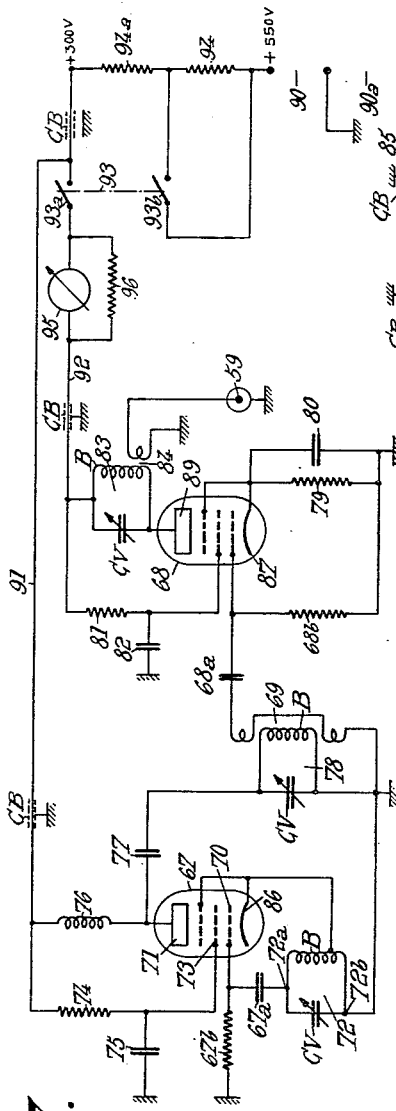
FIGS. 7 and 8 illustrate preferred embodiments of an oscillator and a low-frequency circuit for the device shown in FIG. 6 respectively.
Figure 8:
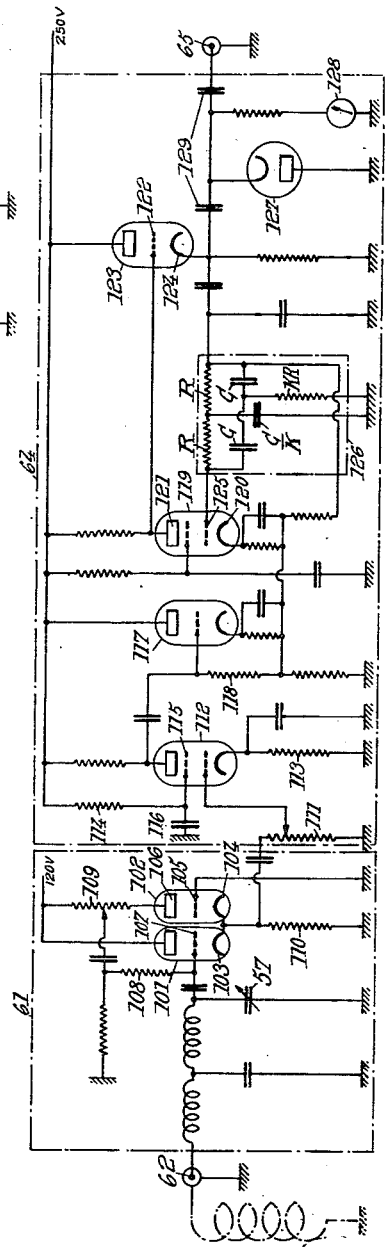

Whereas the decade counter has not been shown in detail, as it may be for any known type (for example of the French "Commissariat à l'Energie Atomique" type disclosed in "Techniques de l'Ingénieur," Electronique I, pp. 1900–4 and 1900–5), on FIGS. 7 and 8 were illustrated preferred embodiments of the oscillator 60 and of amplifier 64 respectively, permitting to obtain sharply tuned high-frequency and low-frequency circuits.

Oscillator 60 shown on FIG. 7 comprises two pentodes 67, 68 the first tube or pentode 67 operating as an oscillator and the second tube or pentode 68 as an amplifier, the coupling between the tuned plate circuit of the first tube and the cathode circuit of the second tube being performed through a transformer 69 in order to provide a very tight couplnig.

The first tube 67, which may be of the EF–80 type, is a portion of an oscillator power amplifier electron coupled circuit deriving from the Hartley type arrangement for a triode (i.e. an arrangement wherein the energizing voltage, which is 180° out of phase relatively to the plate alternating voltage, is obtained by connecting the control grid 70 and the plate 71 to the opposed terminals 72a and 72b of an oscillatory circuit 72) with a shunt feeding and a grid bias through capacitor 67a shunted by a resistor 67b of grid leak, thereby providing an automatic adjustment or control of the oscillator, with the best efficiency conditions and an excellent frequency stability, and rendering self-starting said oscillator.

Further, the electron coupling between the oscillator portion and the amplifier portion of tube 67, which is performed by the screen grid 73 (deriving the feeding voltage thereof from the plate feeding voltage by lowering voltage in the resistor 74 which is short-circuited, for the alternating currents to be amplified, by the decoupling capacitor 75), renders the plate current independent of the plate potential and therefore of the load impedance in the plate circuit, thereby still increasing the stability of the resonance frequency, which is no more influenced by the variation of the load impedance.

The separation between the direct current feeding and the high frequency alternating output is performed, in the known manner for a shunt feeding, by a choke coil or reactor 76 for the radio-frequency, which allows the direct current to reach the plate, whereas it prevents the radio frequency current to reach the source of direct current, and by a decoupling capacitor 77, which stops direct current and prevents it to reach other portions of the circuit than the plate, although it permits the radio frequency to reach the tuned output circuit 78.

This last circuit is coupled, by a very tightly coupled transformer 69, to the grid circuit (input circuit) of the amplifier tube 68 (which may be of the EL–84 type), by providing a grid capacitor 68a shunted by a grid leak resistor 68b.

The arrangement of the pentode tube 68 is an arrangement with self-bias by a cathode resistor 79 decoupled by a capacitor 80 which short-circuits it for the alternating currents having the lowest frequencies to be amplified.

Further, a resistor 81 is used for lowering the plate feeding voltage to the value necessary for the operation of the screen grid, a decoupling capacitor 82 (forming a short-circuit for the alternating current to amplify) being shunt connected relatively to said resistor 81.

The load impedance of the second circuit is also constituted by a tuned circuit 83, coupled by a transformer 84 to cable 59 which delivers the high-frequency oscillations (55 mHz.) to the high-frequency coil 53 of the probe shown in FIG. 6.

On FIG. 7 there are also shown, on the one hand, the low voltage feeding circuit 85 providing from low voltage source 90a the heating of the cathodes 86, 87 of tubes 67 and 68 (the choke coils or reactors 88 preventing the passage of the high-frequency current) and, on the other hand, the high voltage feeding circuit of plates 71 and 89 of pentodes 67 and 68.

It is seen from said figure that the plate circuit of oscillatory pentode 67 is always fed by load 91 from high voltage source 90, thereby ensuring the frequency stability of said pentode, whereas the plate of the amplifying pentode 68 is fed by lead 92 only when switch 93a is closed by a control element 93, said element 93 controlling two ganged or coupled switches 93a, 93b, the closing of 93b having also as a result to short-circuit resistor 94, thereby maintaining unchanged the feeding of first pentode 67.

A milliampere meter 95, shunted by a resistor 96, allows to verify the value of the intensity of the anode feeding current for the second pentode 68.

The values of the circuit elements on FIG. 7 may be the following ones (the resistances of the resistors being indicated in kilohms, the thicknesses of the turns in tenths of a millimeter and the capacities of the capacitors in picofarads)

75 ---------------- 1.5       67a -------------- 22
82 ---------------- 1.5       68a -------------- 100
77 ---------------- 4.7       80  -------------- 1000

Adjustable capacitors CV (of circuits 72, 78 and 83), adjustable from 5 to 30; by-pass capacitors CB, 2200.

74:33 (0.5 watt)
81:4.7 (1 watt)
67b:22 (0.5 watt)
68b:47 (0.5 watt)
79:270 (1 watt)
96: 5 or 10
94:15
94a:3
76:25 turns $2/10$ mm. on a ferrite rod of 4 mm. $\phi$ (diameter)
Coil B of circuit 72:9 turns $15/10$–$\phi$ coil 17 mm.
Coil B of circuit 78:6 turns $15/10$–$\phi$ coil 17 mm.
Coil B of circuit 84:4 turns $15/10$–$\phi$ coil 30 mm.
Secondary coil of 69:2 x 3 turns $15/10$–$\phi$ coil 17 mm.
Secondary coil of 83:1 turn $20/10$–$\phi$ coil 30 mm.

There is thereby provided an oscillator delivering about 8 watts under a sufficiently stable frequency of 55 mHz. ±0.5 mHz. for saturating the electronic line of the paramagnetic radical which is used, this frequency varying very little with the field for weak fields (inferior to about 5 gausses) when a paramagnetic radical with bonded hyperfine structure is used as it results from curves $S_1$ to $S_5$ of FIG. 2, said curves being substantially horizontal for a field comprised between 0 and 5 Hz.

The amplification of the proton signal leaving through cable 62 is successively performed in a preamplifier-oscillator stage 61 at low-frequency with positive feedback and in an amplifier stage 64.

The first stage 61 includes a double triode of the 12AT7 type or two triodes 101—102, coupled by their cathodes 103—104 and arranged as a normal amplifier (grid 105 of the second triode being grounded), with positive feedback of the plate 106 of second triode on the grid 107 of first triode through resistor 108 (of 5 megohm), this feedback being easily controlled by potentiometer 109 (having a total resistance of 100 kilohms), so as to produce the oscillations on the grid impedance of the first triode.

This arrangement permits to a circuit with two outputs to oscillate at its own frequency, the oscillations at a frequency equal to the Larmor frequency of the nuclear spins of sample 51 included in vessel 52 being collected on the common cathode resistor 110.

After lowering or attenuation in an adjustable resistor or potentiometer 111 (realizing a resistance coupling with adjustable volume, between pre-amplifier 61 and amplifier 64), the oscillations are amplified in a tetrode 112 having a self-bias resistance 113 and a voltage lowering resistor 114 for the screen grid 115, shunted by decoupling capacitor 116.

The amplified signal is applied to a cathode-follower triode 117, coupled by resistor 118 to tetrode 112, such a cathode-follower arrangement providing an impedance matching with power amplification but without voltage amplification; triode 117 is coupled to tetrode 119 through cathode 120.

Plate 121 of tetrode 119 delivers therefore a signal which is in phase with the signal applied to cathode 120, the signal on plate 121 being applied on grid 122 of cathode-follower triode 123 having the cathode 124 thereof connected to the control grid 125 of the preceeding tetrode 119 through a band-pass filter 126 of "double T" or "T parallel" type, comprising two capacitors of capacity C and a resistor of resistance KR, on the one hand, and two resistors of resistance R and a capacitor of capacity $$\frac{C}{K}$$

on the other hand, K having for example the value of 0.25. This unit constitutes a selective filter with a narrow pass-band centered on the frequency of the "double T" circuit i.e.

$$\frac{1}{2\pi RC}$$

A portion of the voltage collected on cathode 124 of the cathode-follower tube 123 is applied on cathode 120 of the preceeding tetrode 119, thereby introducing a positive feedback, which still increases the sharpness of the transmitted band. Thereby a very selective amplifier 64, centered on frequency 2100 Hz. and having a pass-band of about 80 Hz., is provided.

The output level of cathode-follower tube 123, clipped by diode 127 and controlled by an optional voltmeter 128 (said diode and said voltmeter being connected in shunt to the ground), has the continuous components thereof suppressed by capacitor 129 before being fed at a low impedance on cable 65 which delivers it to the low frequency measuring device 66 (FIG. 1) which may be constituted, as mentioned herein-above, by a decade counter well known in the art.

The operation of the device shown in FIGS. 6 to 8 is as follows.

Oscillator 60 delivers a high frequency current (for example at 55 mHz.) which saturates the electronic resonance ray or band of the paramagnetic substance (as potassium nitrosodisulfonate) in solution in water (containing protons or hydrogen nuclei), said solution constituting sample 51; the tuning of the high-frequency circuit including coil 53 is perfected by adjusting the capacity of adjustable capacitor 56.

The energy emitted by the nuclear spins (for example the protons of water) is picked up by a low-frequency coil 54 included in the low-frequency tuned circuit (comprising essentially said coil 54 and adjustable capacitor 57), and due to the very high Q factor thereof, the circuit generates itself electromagnetic energy at the nuclear resonance frequency (i.e. 2100 Hz. in case of protons); this energy is amplified in preamplifier 61 and amplifier 62, which are both very selective, and the frequency F of said energy is determined in frequency measuring device or unit 66. As said frequency F is (according to the above-mentioned physical laws) proportional to the strength H of the uniform field $$\vec{H}$$

wherein is disposed sample 51 (at the condition that $$\vec{H}$$

is perpendicular to the axis XX of coils 53 and 54):

$$F = \frac{\gamma H}{2\pi}$$

the ratio $$\frac{\gamma}{2\pi}$$

being known for the various nuclei and in particular for the protons with a very high precision. The relative precision of the magnetic field measurements is still higher, because F, which is strictly proportional H, may be measured with a precision of about 1 part in 1,000,000.

It should be considered that the condition for the device according to the invention to operate as a self-oscillator (self-oscillation condition) is: Q at least equal to $Q_0$, Q being the Q factor of the low-frequency circuit including coil 54 and adjustable capacitor 57, and $Q_0$ a number which depends on the utilized probe and the selected liquid sample in vessel 52; for example for a 0.001 molar solution of peroxylamine nitrosodisulfonate in water (at pH of 11 to 12) and for the probe shown on FIG. 6, $Q_0$ was measured and equals roughly 110.

The $Q_0$ of the probe with the adjustable capacitor 57 being only equal to about 60, it was effectively increased as explained herein-above, by the positive feedback circuit comprising resistor 108 and potentiometer 109.

In a modification of the illustrated embodiment, it is possible to provide in the low-frequency circuit a further coil, said circuit including then two coils, one of said coils corresponding to coil 54, having a Q of about 50 for example, constituting a portion of the probe and receiving the proton signal, whereas the further coil is constituted by turns coiled around a ferrite core thereby enjoying a very high Q (for example a Q of about 500) and is located near amplifier 64, the low-frequency circuit with both coils having a Q over 110 and more generally over $Q_0$.

As it is advantageous that the tuning frequency of the low-frequency circuit having a high Q be as near as possible the Larmor frequency of the nuclei (protons) selected, this tuning is performed automatically, either by operating adjustable capacitor 57 (in case of a Q factor increased by a positive feedback as shown) or by changing the permeability of the ferrite core by saturation through a direct current field (in the case of Q factor increased by using two coils).

Since certain modifications may be made in the device of the present invention without departing from the scope thereof, it is intended that all matter contained in the foregoing description and shown in the accompanying drawings be interpreted merely as illustrative and not in a limiting sense.

The present application is a continuation-in-part application of co-pending patent application Ser. No. 725,746, filed April 1, 1958.

What we claim is:

1. Device for measuring the earth magnetic field comprising: a container; a solution in said container, said solution being constituted by a solvent containing atomic nuclei having a non-zero angular momentum and magnetic moment and, dissolved in said solvent, a paramagnetic substance of bound hyperfine structure having in the absence of any magnetic field an electronic resonance frequency line different from zero and in the earth magnetic field at least one electronic resonance line saturable at a given frequency, a saturation of said last mentioned resonance line increasing materially the nuclear polarization of said nuclei; a high frequency circuit including a high-frequency coil surrounding said container and an oscillator generating a frequency equal to said determined frequency; means for stabilizing the oscillator frequency on said determined frequency; a low-frequency circuit of very high Q factor including a low-frequency coil coaxial to said high-frequency coil and surrounding said container; means for sharply tuning said low-frequency circuit on said nuclear resonance frequency; means for shielding said high-frequency coil from said low-frequency coil; and means for measuring the frequency of the energy generated in said low-frequency circuit when said container is located in said magnetic field.

2. Device according to claim 1, wherein said high-frequency circuit comprises in series: an extremely stable high-frequency oscillator; said high-frequency coil, constituted by a few turns of relatively thick wire; said shielding means, constituted by a highly conductive metallic shield located between said high-frequency coil and said low-frequency coil; and an adjustable capacitor.

3. Device according to claim 2, wherein said oscillator includes an electron tube with an oscillating and an amplifying portion and means for electron coupling said oscillating portion and said amplifying portion.

4. Device according to claim 3, wherein said electron tube includes a cathode, a control grid, a screen grid and an anode, and further including a first capacitor and an oscillating circuit in series between said control grid and said cathode, a first resistor shunting said first capacitor, means for permanently polarizing said anode, a second resistor connected between said polarizing means and said screen grid, and a second capacitor shunting said second resistor.

5. Device according to claim 1, wherein said low-frequency circuit includes in series: said low-frequency coil, constituted by several hundred turns of a relatively thin wire; an amplifier with an amplifying section comprising a first electron tube and a second electron tube, each tube including a cathode, a control grid and an anode, a very narrow band-pass filter connected between the cathode of said second tube and the control grid of said first tube, a lead connecting the anode of said first tube to the grid of said second tube, filter means for partially connecting said cathode of said second tube to the cathode of said first tube, the cathode of said first tube receiving the signal picked-up by said low-frequency coil; and a frequency measuring unit receiving from the cathode of said second tube said signal as amplified and filtered by said amplifying section.

6. Device for measuring the earth magnetic field comprising: a container; a solution in said container, said solution being constituted by a solvent containing atomic nuclei having a non-zero angular momentum and magnetic moment and, dissolved in said solvent, a paramagnetic field at least one electronic resonance line saturable the absence of any magnetic field an electronic resonance frequency line different from zero and in the earth magnetic field ta least one electronic resonance line saturable at a given frequency, a saturation of said last mentioned resonance line increasing materially the nuclear polarization of said nuclei; a high frequency circuit comprising in series an extremely stable high-frequency oscillator generating a frequency equal to said determined frequency, a high-frequency coil surrounding said container, a highly conductive metallic sleeve surrounding said high-frequency coil, and an adjustable capacitor; a low-frequency circuit of very high Q factor including in series a low-frequency coil surrounding said sleeve, an amplifier with an amplifying section comprising a first electron tube and a second electron tube, each tube including a cathode, a control grid and an anode, a very narrow band-pass filter connected between the cathode of said second tube and the control grid of said first tube, a lead connecting the anode of said first tube to the grid of said second tube, filter means for partially connecting said cathode of said second tube to the cathode of said first tube, the cathode of said first tube receiving the signal picked up by said low-frequency coil, and a frequency measuring unit receiving from the cathode of said second tube said signal as amplified and filtered by said amplifying section.

7. Device according to claim 6, wherein said pass-band filter is a T parallel filter comprising a first T portion with two resistors in series and a capacitor between the common terminal of said resistors and ground and a second T portion with two capacitors in series and a resistor between the common terminal of said capacitors and ground, one of the remaining terminals of said first T portion being connected to one of the remaining terminals of said second T portion and to the control grid of said first tube, whereas the other remaining terminal of said first T portion is connected to the other remaining terminal of said second T portion and to the cathode of said second tube.

8. Device according to claim 6, wherein said paramagnetic substance includes, in its structure, at least one nucleus and at least one electron of non-zero angular momentum magnetic moment in stationary interaction with said nucleus.

9. Device according to claim 6, wherein said nuclei of non-zero angular momentum and magnetic moment are protons.

10. Device according to claim 9, wherein said container encloses water, as proton containing substance, and in said water dissolved nitrosodisulfonate ions, as paramagnetic substance.

References Cited in the file of this patent

FOREIGN PATENTS 1,141,373   France _____ Mar. 18, 1957

OTHER REFERENCES

Carver et al.: Physical Review, vol. 102, No. 4, May 15, 1956, pp. 975 to 980.

Beljers et al.: Physical Review, vol. 95, No. 6, Sept. 15, 1954, p. 1683.

Pound et al.: The Review of Scientific Instruments, vol. 21, No. 3 March 1950, pp. 219 to 224.

Carver et al.: Physical Review, vol. 92, No. 1, 1953, pp. 212 and 213.

Codrington et al.: The Journal of Chemical Physics, vol. 29, No. 3, September 1958, pp. 600 to 604.

Burgess et al.: Physical Review, vol. 100, No. 2, October 1955, pp. 752 to 753.

Abragam et al.: Academie des Sciences, Comptes Rendus, vol. 247, No. 2, July 1957, pp. 157 to 160.

UNITED STATES PATENT OFFICE
CERTIFICATE OF CORRECTION

Patent No. 3,049,662                                August 14, 1962

Anatole Abragam et al.

It is hereby certified that error appears in the above numbered patent requiring correction and that the said Letters Patent should read as corrected below.

Column 17, line 44, before "field" insert -- substance of bound hyperfine structure having in the absence of any magnetic field an electronic resonance frequency line differenct from zero and in the earth magnetic --; lines 45, 46 and 47, strike out "the absence of any magnetic field an electronic resonance frequency line different from zero and in the earth magnetic field ta least one electronic resonance line saturable".

Signed and sealed this 16th day of July 1963.

(SEAL)
Attest:

ERNEST W. SWIDER                                   DAVID L. LADD
Attesting Officer                                        Commissioner of Patents